(12) United States Patent
Schepergerdes

(10) Patent No.: US 9,714,675 B2
(45) Date of Patent: Jul. 25, 2017

(54) LOCKNUT ASSEMBLY

(71) Applicant: SPS Technologies, LLC, Jenkintown, PA (US)

(72) Inventor: Wilhelm Schepergerdes, Irvine, CA (US)

(73) Assignee: SPS TECHNOLOGIES, LLC, Jenkintown, PA (US)

( * ) Notice: Subject to any disclaimer, the term of this patent is extended or adjusted under 35 U.S.C. 154(b) by 7 days.

(21) Appl. No.: 14/881,833

(22) Filed: Oct. 13, 2015

(65) Prior Publication Data

US 2017/0102023 A1 Apr. 13, 2017

(51) Int. Cl.
*F16B 39/10* (2006.01)
*F16B 39/12* (2006.01)

(52) U.S. Cl.
CPC ............ *F16B 39/108* (2013.01); *F16B 39/12* (2013.01)

(58) Field of Classification Search
CPC ........ F16B 37/042; F16B 39/12; F16B 39/26; F16B 39/108; F16B 39/10
USPC ................. 411/204, 207, 321, 432, 436, 546
See application file for complete search history.

(56) References Cited

U.S. PATENT DOCUMENTS

| 578,276 A | 3/1897 | Gustavus | |
| 897,168 A * | 8/1908 | Smith | F16B 39/12 411/222 |
| 1,241,181 A * | 9/1917 | Wilhelm | F16B 39/108 411/201 |
| 3,464,474 A | 9/1969 | Jansen | |
| 3,581,609 A | 6/1971 | Greenwood | |
| 5,244,290 A * | 9/1993 | Chi | B62K 21/18 403/24 |
| 5,391,032 A * | 2/1995 | Vassalotti | F16B 39/12 411/198 |
| 5,772,373 A * | 6/1998 | Cronin, II | B25B 13/48 411/120 |
| 6,053,681 A * | 4/2000 | Mattershead | F16B 39/00 411/14 |

(Continued)

FOREIGN PATENT DOCUMENTS

| DE | 553123 | 6/1932 |
| GB | 512314 | 8/1939 |
| GB | 983726 | 2/1965 |

OTHER PUBLICATIONS

ISRWO of PCT/US2016/056541 dated Jan. 11, 2017.

*Primary Examiner* — Roberta Delisle
(74) *Attorney, Agent, or Firm* — Burris Law, PLLC

(57) ABSTRACT

A locknut assembly for securing a component to a shaft is provided that includes, in one form, a locknut defining an internal cavity and an aperture having internal threads, the internal cavity defining an internal wall comprising at least one location feature. A lockwasher defines an internal cavity, an external wall comprising at least one mating location feature, and an anti-rotation feature disposed within the internal cavity and adapted for engagement with a corresponding anti-rotation feature located at an end portion of the shaft. The internal threads of the locknut aperture engage continuous external threads of the shaft, the mating location feature of the lockwasher engages the location feature of the locknut, and the anti-rotation feature of the lockwasher engages the corresponding anti-rotation feature of the shaft to limit rotation of the locknut.

20 Claims, 5 Drawing Sheets

(56) References Cited

U.S. PATENT DOCUMENTS

| | | | |
|---|---|---|---|
| 8,979,457 B2* | 3/2015 | Cormier | F16B 39/284 |
| | | | 411/204 |
| 2005/0025607 A1* | 2/2005 | Guantonio | F16B 39/12 |
| | | | 411/222 |
| 2005/0084364 A1* | 4/2005 | Tuszynski | F16B 37/0864 |
| | | | 411/432 |
| 2007/0286699 A1 | 12/2007 | Rode | |
| 2013/0209194 A1* | 8/2013 | Kratzer | F16B 37/14 |
| | | | 411/204 |

* cited by examiner

LOCKNUT ASSEMBLY

FIELD

The present disclosure relates generally to locking fasteners, and more particularly to a locknut assembly for use in securing a part to a rotating shaft, or other component subjected to vibration, movement, or other forces.

BACKGROUND

The statements in this section merely provide background information related to the present disclosure and may not constitute prior art.

Locknut assemblies are used to secure mechanical components to each other in applications where the components are rotating, vibrating, or are subjected to other forces. In one application, locknut assemblies are used to retain a rotatable member on a shaft or axle. Locknut assemblies in the art generally include a nut that secures the components, and a washer that includes a key for aligning with a keyway disposed along a shaft of the rotating component for anti-rotation of the nut, such as that shown in U.S. Pat. No. 5,533,794.

Referring to FIGS. 1 through 6, additional forms of washers having different keys and keyways are illustrated in greater detail. In FIGS. 1 and 2, a slotted washer 1 engages a shafting having opposed cuts 3 extending through its threads 5. In FIGS. 3 and 4, a keyed washer 7 includes two keys 9 that engage opposed keyways 11, and in FIGS. 5 and 6, a serrated washer 13 includes a serrated inner surface 15 that engages a corresponding serrated outer surface 17 of the shaft. Although these known locknut assemblies provide some degree of anti-rotation for the nut, they are not as effective in high vibration/rotational environments and can be a source of cracking or damage to the threads disposed along the shaft.

SUMMARY

In one form, the present disclosure provides a locknut assembly for securing at least one component, the locknut assembly comprising a locknut defining an internal cavity and an aperture extending through the internal cavity, the internal cavity defining an internal wall comprising at least one location feature. The locknut assembly also includes a lockwasher defining an internal cavity, an external wall comprising at least one mating location feature, and an anti-rotation feature disposed within the internal cavity and adapted for engagement with a corresponding anti-rotation feature located at an end portion of the shaft. The mating location feature of the lockwasher engages the location feature of the locknut, and the anti-rotation feature of the lockwasher engages the corresponding anti-rotation feature of the component to limit rotation of the locknut.

In another form, a locknut assembly for securing at least one component having external threads is provided, the locknut assembly comprising a locknut defining an internal cavity, an external tool engagement portion, and an aperture having internal threads extending through the internal cavity, the internal cavity defining an internal wall comprising a plurality of splines. A lockwasher defines an internal cavity, an external wall comprising a corresponding plurality of splines adapted for engagement with the plurality of splines of the locknut, and a protrusion disposed within the internal cavity, the protrusion being aligned with the locknut aperture and a longitudinal axis of the component. The internal threads of the aperture engage the external threads of the component, and the protrusion of the lockwasher engages a recess located at an end portion of the component to limit rotation of the locknut.

In still another form, a structural assembly is provided that comprises at least one component defining an end portion having continuous external threads and a locknut assembly. The locknut assembly comprises a locknut defining an internal cavity and an aperture having internal threads extending through the internal cavity, the internal cavity defining an internal wall comprising at least one location feature. The locknut assembly further comprises a lockwasher defining an internal cavity, an external wall comprising at least one mating location feature, and an anti-rotation feature disposed within the internal cavity and adapted for engagement with a corresponding anti-rotation feature located at an end portion of the component. The internal threads of the locknut aperture engage the external threads of the component, the mating location feature of the lockwasher engages the location feature of the locknut, and the anti-rotation feature of the lockwasher engages the corresponding anti-rotation feature of the component to limit rotation of the locknut.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 2:
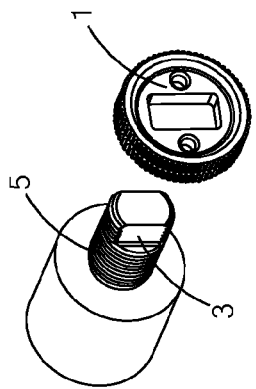
FIG. 2 is a perspective view of a washer of the prior art locknut assembly of FIG. 1 and a mating shaft.
Figure 4:
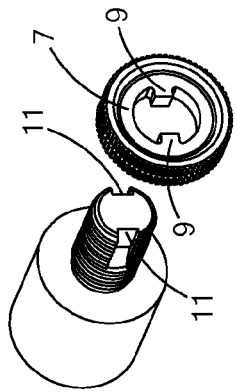
FIG. 4 is a perspective view of a washer of the prior art locknut assembly of FIG. 3 and a mating shaft.
Figure 6:
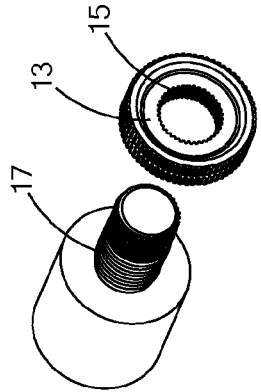
FIG. 6 is a perspective view of a washer of the prior art locknut assembly of FIG. 5 and a mating shaft.
Figure 1:
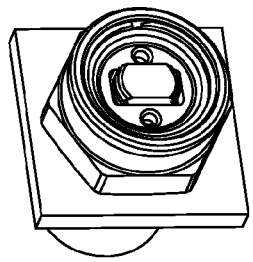
FIG. 1 is a perspective view of a locknut assembly according to the prior art.
Figure 3:
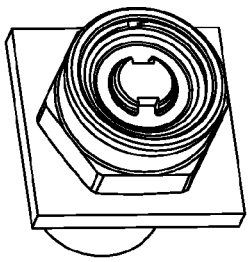
FIG. 3 is a perspective view of another locknut assembly according to the prior art.
Figure 5:
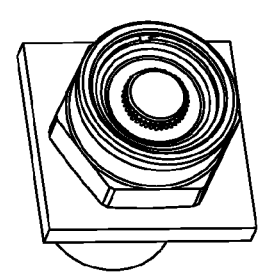
FIG. 5 is a perspective view of yet another locknut assembly according to the prior art.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Figure 7:
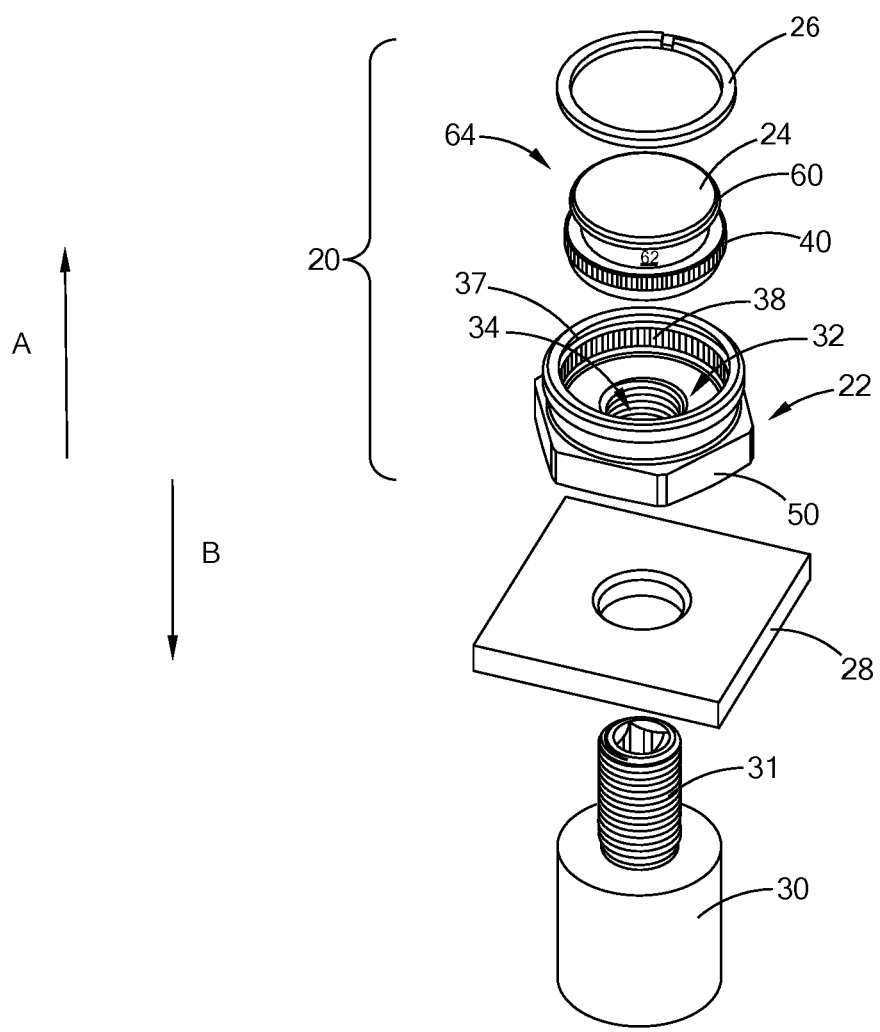
FIG. 7 is an exploded view of a locknut assembly, a shaft, and a component to be secured to the shaft using the locknut assembly constructed in accordance with the principles of the present disclosure.
Figure 8:
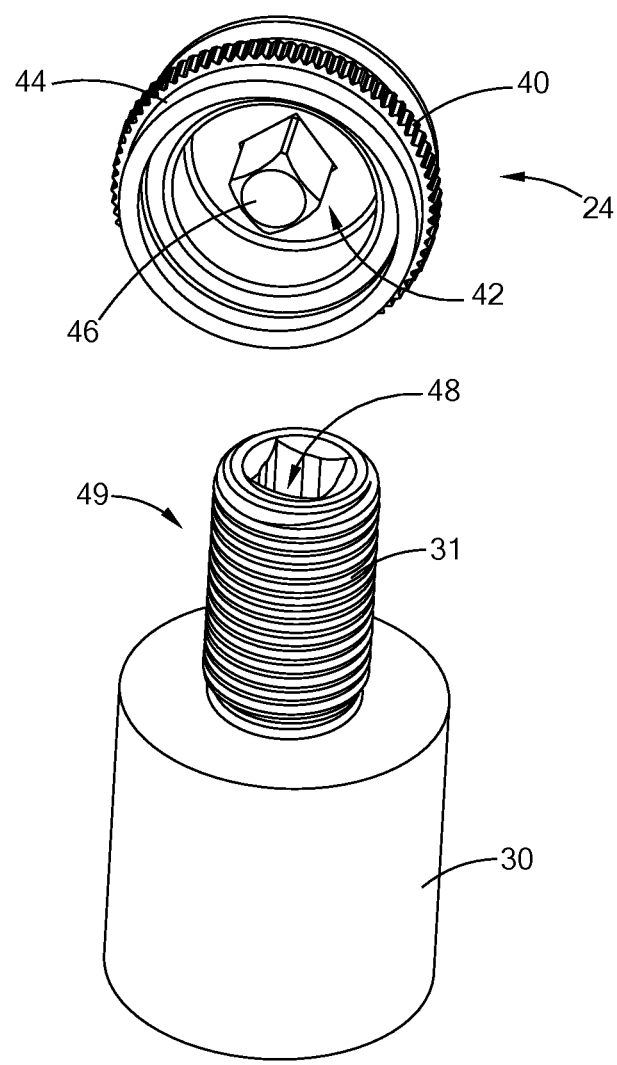
FIG. 8 is a perspective view of a lockwasher and a corresponding threaded shaft of FIG. 7.
Figure 9:
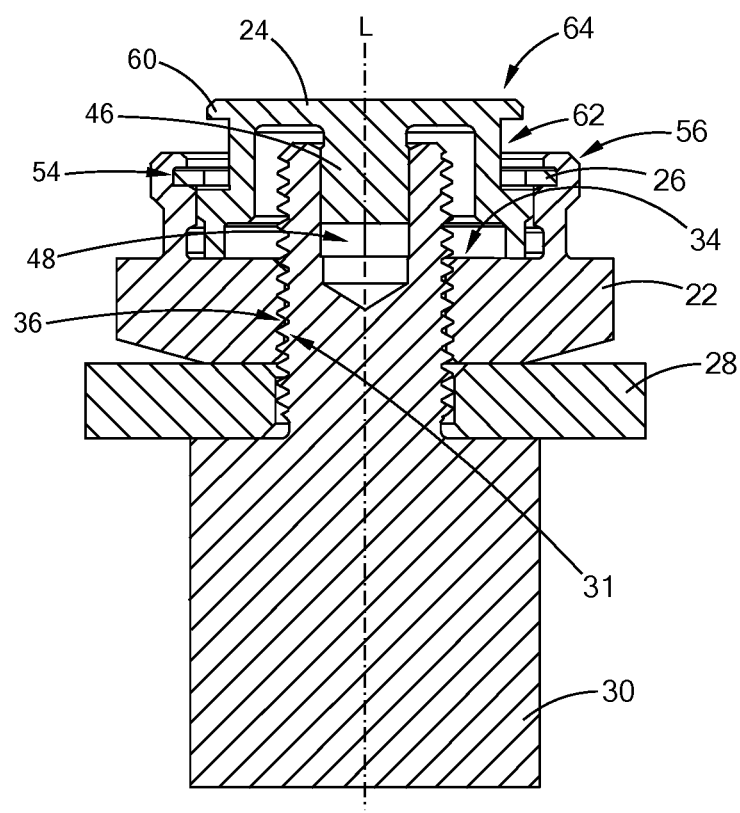
FIG. 9 is a cross-sectional view of the locknut assembly of FIGS. 7 and 8 securing the component to the shaft.

Referring to FIGS. 7 through 9, one form of a locknut assembly is illustrated and generally indicated by reference numeral 20. The locknut assembly 20 comprises a locknut 22, a lockwasher 24, and optionally a lockring 26. The locknut assembly 20 is used to secure a component 28 (or multiple components, not shown) to a shaft 30 as described in greater detail below. It should be understood that the illustration and description of a shaft 30 should not be construed as limiting the inventive locknut assembly 20 to use with only a shaft 30, or a rotating part. The locknut assembly 20 may be employed to secure any number of components that are subjected to rotation, vibration, or other environmental forces or conditions while remaining within the scope of the present disclosure. Additionally, as used throughout, the terms "proximal" or "proximally" should be construed as being the direction of arrow A in FIG. 7, and the terms "distal" or "distally" should be construed as being in the direction of arrow B in FIG. 7.

As shown, the locknut 22 defines an internal cavity 32 and an aperture 34 extending through the internal cavity 32. In one form, the aperture 34 defines internal threads 36 as shown, which are adapted to engage external threads 31 of the shaft 30, thus allowing the locknut 22 to secure the component 28 to the shaft 30, as best shown in FIG. 9.

The internal cavity 32 of the locknut 22 defines an internal wall 37 comprising at least one location feature to engage the lockwasher 24, which in this form is a plurality of splines 38. It should be understood that the splines 38 are merely exemplary, and thus any number of features may be used to locate and secure the lockwasher 24 within the locknut 22 while remaining within the scope of the present disclosure. As shown, the splines 38 have ridges and grooves, which are adapted to engage corresponding ridges and grooves of the splines 40 on the lockwasher 24.

As further shown, the lockwasher 24 also defines an internal cavity 42, an external wall 44 comprising at least one mating location feature, which in this form is splines 40, and an anti-rotation feature 46 disposed within the internal cavity 42. The anti-rotation feature 46 is adapted for engagement with a corresponding anti-rotation feature 48 located at an end portion 49 of the shaft 30. In this form, the anti-rotation feature 46 of the lockwasher 24 is a protrusion disposed within the cavity 42 of the lockwasher 24, which extends distally towards the aperture 34 of the locknut 22. The protrusion in this form is aligned with the locknut aperture 34 and a longitudinal axis L of the shaft 30. More specifically, the protrusion defines a square outer periphery in this form of the present disclosure. Accordingly, the anti-rotation feature 48 of the shaft 30 defines a square recess, which is engaged by the square protrusion, or anti-rotation feature 46 of the lockwasher 24.

After the locknut 22 is threadably secured against the component 28, the lockwasher 24 is placed into the internal cavity 32 of the locknut 22, wherein the mating location feature (e.g. splines 40) of the lockwasher 24 engages the location feature (e.g. splines 38) of the locknut 22, and the anti-rotation feature 46 (e.g. square protrusion) of the lockwasher 24 engages the corresponding anti-rotation feature 48 (e.g. square recess) of the shaft 30 to limit rotation of the locknut 22 relative to the shaft 30 during operation/use of the shaft 30 and component 28.

The number of splines 38, 40 on each of the locknut 22 and lockwasher 24 are configured for higher resolution of installation of the lockwasher 24 to the shaft 30, and more specifically, to accommodate the 90° of rotation to insert the square protrusion 46 of the lockwasher 24 into the square recess 48 of the shaft 30.

As further shown in FIG. 7, the locknut 22 includes an optional external tool engagement portion 50, which in this form is a hex shape. The external tool engagement portion 50 is adapted for engagement by a tool (not shown) in order to tighten the locknut 22 against the component 28 and shaft 30, or to apply a proper amount of torque.

In one form, the locknut assembly 20 further includes the lockring 26, which is used to secure the lockwasher 24 to the locknut 22. As best shown in FIG. 9, the locknut 22 comprises an internal groove 54 disposed around a proximal end portion 56 of its cavity 32, in which the lockring 26 is secured once the lockwasher 24 is properly installed within the locknut 22 and to the shaft 30. Other forms of securing the lockwasher 24 may be employed while remaining within the scope of the present disclosure, such as by way of example, retention pins, snap rings, spring wires, or set screws.

As further shown, the lockwasher 24 further comprises an external removal feature defining a flange 60 and an undercut 62 disposed along a proximal end 64 thereof (the combination of which is also referred to as a "hat"). The flange 60 and undercut 62 provide a feature by which a user, or a user's tool, can engage in order to more readily remove the lockwasher 24 from the locknut 22. It should be understood that this removal feature is optional and should not be construed as limiting the scope of the present disclosure.

Referring back to the anti-rotation feature 48 of the shaft 30, it should be understood that the exemplary form of a square protrusion within the lockwasher 24 and a square recess in the shaft 30 may be reversed, such that the anti-rotation feature of the lockwasher 24 comprises a recess disposed within its cavity, and the anti-rotation feature of the shaft 30 comprises a corresponding protrusion while remaining within the scope of the present disclosure.

Figure 12:
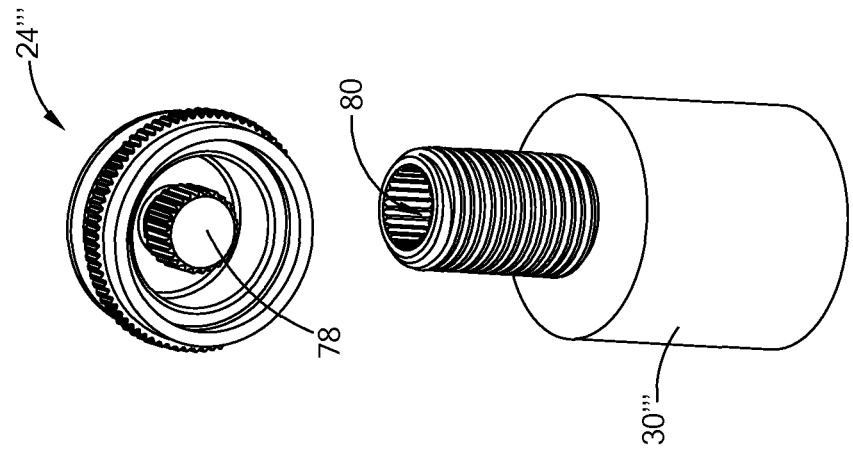
FIG. 12 is a perspective view of still another alternate form of a lockwasher and a shaft constructed in accordance with the principles of the present disclosure.
Figure 11:
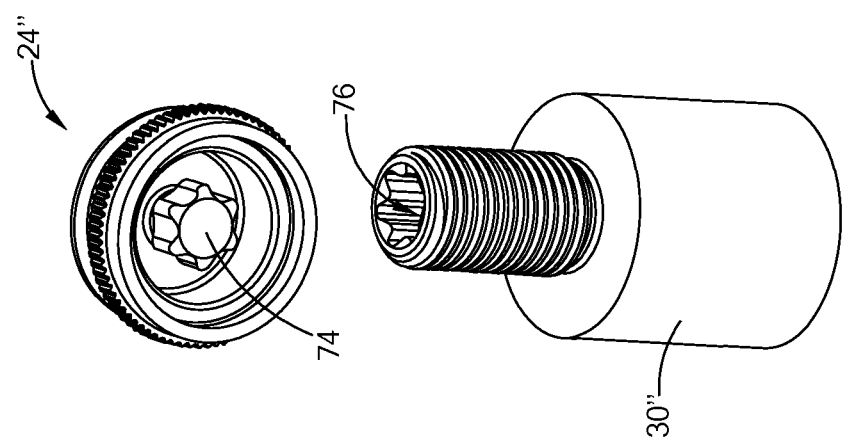
FIG. 11 is a perspective view of another alternate form of a lockwasher and a shaft constructed in accordance with the principles of the present disclosure.
Figure 10:
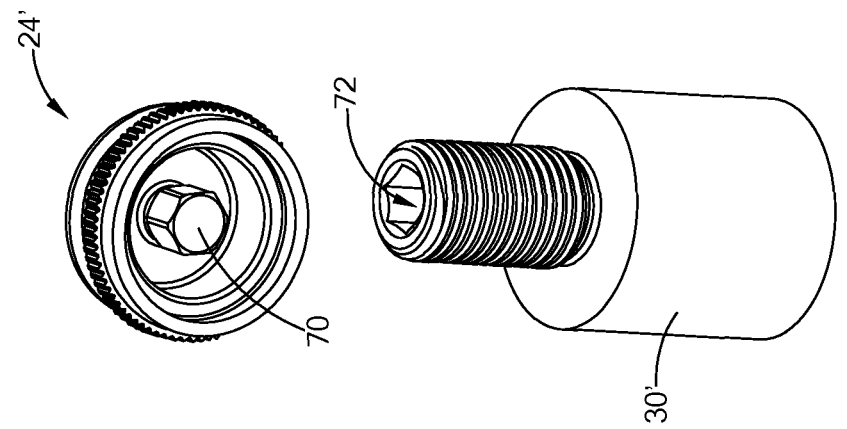
FIG. 10 is a perspective view of an alternate form of a lockwasher and a shaft constructed in accordance with the principles of the present disclosure.

As shown in FIGS. 10-12, alternate forms of protrusions within the lockwasher 24 (which may be reversed and included on the shaft 30 with corresponding recesses in the lockwasher 24) are illustrated. These alternate forms of protrusions include a hex protrusion 70 and corresponding hex recess 72 (FIG. 10), a Torx® shape protrusion (i.e., 6-point star-shaped pattern) 74 and corresponding Torx® shape recess 76 (FIG. 11), and a splined protrusion 78 and corresponding splined recess 80 (FIG. 12). It should be understood that these alternate protrusion geometries are merely exemplary and should not be construed as limiting the scope of the present disclosure. Additionally, more than one protrusion, or anti-rotation feature, may be employed while remaining within the scope of the present disclosure.

Advantageously, the locknut assembly 20 of the present disclosure, with its anti-rotation feature that is internal to the lockwasher 24 along with the anti-rotation feature that is internal to the shaft 30, allows for continuous external threads 31 around the end portion 49 of the shaft 30. As set forth in the Background and FIGS. 1-6, the prior art locknut assemblies require their shaft threads to be interrupted, or discontinuous, to secure their lockwashers. The present disclosure provides an innovative locknut assembly 20 that engages an internal feature of the shaft 30 so as to preserve the integrity of the external threads 31 of the shaft.

It should be understood that any number of materials, including metals and non-metallic materials, may be used for each of the components described herein. Although metals are used in one form of the locknut 22 and lockring 24 in order to carry higher loads and withstand harsher environments, any number of materials may be employed, including by way of example, ceramics, plastics, and various composites (e.g., discontinuous fiber reinforced plastic) while remaining within the scope of the present disclosure.

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A locknut assembly for securing at least one component to a shaft, the locknut assembly comprising:
    a locknut defining an internal cavity and an aperture extending through the internal cavity, the internal cavity defining an internal wall comprising at least one location feature; and
    a lockwasher defining an internal cavity, an external wall comprising at least one mating location feature, and an anti-rotation feature disposed within the internal cavity and adapted for engagement with a corresponding anti-rotation feature located at an end portion of the shaft,
    wherein the mating location feature of the lockwasher engages the location feature of the locknut, and the anti-rotation feature of the lockwasher engages the corresponding anti-rotation feature of the shaft to limit rotation of the locknut.

2. The locknut assembly according to claim 1, wherein the aperture of the locknut comprises internal threads, the internal threads engaging external threads disposed along the end portion of the shaft.

3. The locknut assembly according to claim 2, wherein the location feature of the locknut comprises a plurality of splines having ridges and grooves, and the mating location feature of the lockwasher comprises a plurality of corresponding splines having ridges and grooves, wherein the ridges of the locknut engage the grooves of the lockwasher, and the ridges of the lockwasher engage the grooves of the locknut.

4. The locknut assembly according to claim 1, wherein the locknut comprises an external tool engagement portion.

5. The locknut assembly according to claim 1, wherein the anti-rotation feature of the lockwasher comprises a protrusion disposed within the cavity of the lockwasher and extending distally towards the aperture of the locknut, the protrusion adapted to engage a corresponding recess disposed within the end portion of the shaft.

6. The locknut assembly according to claim 5, wherein the protrusion defines a square outer periphery.

7. The locknut assembly according to claim 5, wherein the protrusion defines an outer periphery geometry selected from the group consisting of a hex, a 6-point star-shaped pattern, and serrations.

8. The locknut assembly according to claim 1, wherein the anti-rotation feature of the lockwasher comprises a recess disposed within the cavity of the lockwasher, the recess adapted to engage a corresponding protrusion disposed proximate the end portion of the shaft.

9. The locknut assembly according to claim 1, wherein the locknut further comprises an internal groove disposed around a proximal end portion of the cavity of the locknut, and the locknut assembly further comprises a lockring disposed within the internal groove of the locknut.

10. The locknut assembly according to claim 1, wherein the lockwasher further comprises an external removal feature defining a flange and an undercut disposed along a proximal end thereof.

11. A locknut assembly for securing at least one component to a shaft having external threads, the locknut assembly comprising:
    a locknut defining an internal cavity, an external tool engagement portion, and an aperture having internal threads extending through the internal cavity, the internal cavity defining an internal wall comprising a plurality of splines; and
    a lockwasher defining an internal cavity, an external wall comprising a corresponding plurality of splines adapted for engagement with the plurality of splines of the locknut, and a protrusion disposed within the internal cavity, the protrusion being aligned with the locknut aperture and a longitudinal axis of the shaft,
    wherein the internal threads of the aperture engage the external threads of the shaft, and the protrusion of the lockwasher engages a recess located at an end portion of the shaft to limit rotation of the locknut.

12. The locknut assembly according to claim 11, wherein the protrusion defines a square outer periphery.

13. The locknut assembly according to claim 11, wherein the protrusion defines an outer periphery geometry selected from the group consisting of a hex, a 6-point star-shaped pattern, and serrations.

14. The locknut assembly according to claim 11, wherein the locknut further comprises an internal groove disposed around a proximal end portion of the cavity of the locknut, and the locknut assembly further comprises a lockring disposed within the internal groove of the locknut.

15. The locknut assembly according to claim 11, wherein the lockwasher further comprises an external removal feature defining a flange and an undercut disposed along a proximal end thereof.

16. A structural assembly comprising:
    a shaft defining an end portion having continuous external threads;
    at least one component secured to the shaft; and
    a locknut assembly for securing the component to the shaft, the locknut assembly comprising:
        a locknut defining an internal cavity and an aperture having internal threads extending through the internal cavity, the internal cavity defining an internal wall comprising at least one location feature; and
        a lockwasher defining an internal cavity, an external wall comprising at least one mating location feature, and an anti-rotation feature disposed within the internal cavity and adapted for engagement with a corresponding anti-rotation feature located at an end portion of the shaft,
    wherein the internal threads of the locknut aperture engage the continuous external threads of the shaft, the mating location feature of the lockwasher engages the location feature of the locknut, and the anti-rotation feature of the lockwasher engages the corresponding anti-rotation feature of the shaft to limit rotation of the locknut.

17. The locknut assembly according to claim 16, wherein the anti-rotation feature of the lockwasher comprises a protrusion disposed within the cavity of the lockwasher and extending distally towards the aperture of the locknut, the protrusion adapted to engage a corresponding recess disposed within the end portion of the shaft.

18. The locknut assembly according to claim 17, wherein the protrusion defines a square outer periphery.

19. The locknut assembly according to claim 17, wherein the protrusion defines an outer periphery geometry selected from the group consisting of a hex, a 6-point star-shaped pattern, and serrations.

20. The locknut assembly according to claim 16, wherein the anti-rotation feature of the lockwasher comprises a recess disposed within the cavity of the lockwasher, the recess adapted to engage a corresponding protrusion disposed proximate the end portion of the shaft.

\* \* \* \* \*